(12) United States Patent
Bao et al.

(10) Patent No.: US 9,963,350 B2
(45) Date of Patent: May 8, 2018

(54) ZSM-5 TYPE MOLECULAR SIEVE SYNTHESIS METHOD

(71) Applicants: China University of Petroleum-Beijing, Beijing (CN); China National Petroleum Corporation, Beijing (CN)

(72) Inventors: Xiaojun Bao, Beijing (CN); Yuanyuan Yue, Beijing (CN); Tiesen Li, Beijing (CN); Haiyan Liu, Beijing (CN); Shengbao He, Beijing (CN); Jianning Yu, Beijing (CN)

(73) Assignees: China National Petroleum Corporation, Beijing (CN); China University of Petroleum- Beijing, Beijing (CN)

( * ) Notice: Subject to any disclaimer, the term of this patent is extended or adjusted under 35 U.S.C. 154(b) by 476 days.

(21) Appl. No.: 14/648,425

(22) PCT Filed: Nov. 28, 2013

(86) PCT No.: PCT/CN2013/088055
§ 371 (c)(1),
(2) Date: Sep. 1, 2015

(87) PCT Pub. No.: WO2014/082587
PCT Pub. Date: Jun. 5, 2014

(65) Prior Publication Data
US 2016/0002061 A1  Jan. 7, 2016

(30) Foreign Application Priority Data

Nov. 29, 2012 (CN) .......................... 2012 1 0500634

(51) Int. Cl.
| | | |
|---|---|---|
| *C01B 39/40* | (2006.01) | |
| *C01B 39/38* | (2006.01) | |
| *B01J 20/18* | (2006.01) | |
| *B01J 29/40* | (2006.01) | |
| *B01J 35/00* | (2006.01) | |

(52) U.S. Cl.
CPC .............. *C01B 39/40* (2013.01); *B01J 20/18* (2013.01); *B01J 29/40* (2013.01); *B01J 35/002* (2013.01); *C01B 39/38* (2013.01)

(58) Field of Classification Search
CPC .......... C01B 39/38; C01B 39/40; B01J 20/18; B01J 29/40
See application file for complete search history.

(56) References Cited

U.S. PATENT DOCUMENTS

| | | | |
|---|---|---|---|
| 3,702,886 A | 11/1972 | Argauer et al. | |
| 4,091,007 A | 5/1978 | Dwyer et al. | |
| 6,908,603 B2 | 6/2005 | Xu et al. | |
| 7,601,330 B2 * | 10/2009 | Wang ...................... C01B 39/40 | 423/705 |
| 2009/0023968 A1 * | 1/2009 | Wang .................... B01J 29/068 | 585/323 |
| 2012/0230910 A1 * | 9/2012 | Choi ....................... B01J 20/18 | 423/701 |

FOREIGN PATENT DOCUMENTS

| | | | |
|---|---|---|---|
| CN | 1803613 | | 7/2006 |
| CN | 1803613 A | * | 7/2006 |
| CN | 101462740 A | * | 12/2007 |
| CN | 101332995 | | 12/2008 |
| CN | 101462740 | | 6/2009 |
| CN | 101722024 | | 6/2010 |
| CN | 101723405 | | 6/2010 |
| CN | 102464334 | | 5/2012 |

(Continued)

OTHER PUBLICATIONS

Search report for Chinese Patent Application No. 201210500634.4, dated Oct. 22, 2014.
First office action for Chinese Patent Application No. 201210500634.4, dated Oct. 31, 2014.
Feng H, et al., In-situ synthesis and catalytic activity of ZSM-5 zeolite, Applied Clay Science, 2009, 42:439-445.

*Primary Examiner* — David M Brunsman
(74) *Attorney, Agent, or Firm* — Loza & Loza, LLP; Michael Fedrick

(57) ABSTRACT

The present invention pertains to the field of molecular sieve synthesis, and relates to a synthesis method of ZSM-5 type molecular sieves. In this method, natural minerals, i.e., natural kaolin and natural diatomite, are used as the total silicon source and aluminum source required for the molecular sieve synthesis, and these two natural minerals are calcinated and subjected to acidic (alkaline) treatment before they are mixed at a certain ratio, and then crystallized under hydrothermal conditions to obtain the product, a ZSM-5 type molecular sieve. The ZSM-5 type molecular sieve obtained by the method according to the present invention is a hierarchical porous material having a crystallinity of 70% to 120% as compared to conventional ZSM-5 type molecular sieves synthesized by using pure chemical reagents, and the silica-to-alumina ratio in the molecular sieve product may be adjusted by varying the ratio of the two minerals in the raw materials for the synthesis. According to the present invention, the range of raw materials for the preparation of molecular sieve materials is broadened, and therefore not only the cost for the molecular sieve production is greatly reduced but also the greenness in the production process of the molecular sieve material is significantly improved.

7 Claims, 6 Drawing Sheets

(56) References Cited

FOREIGN PATENT DOCUMENTS

| | | | | | |
|---|---|---|---|---|---|
| CN | 102963908 | A | * | 11/2012 | |
| CN | 105084390 | A | * | 5/2014 | |
| CN | 105731492 | A | * | 1/2016 | |
| CN | 106185977 | E | * | 6/2016 | ............ C01B 39/38 |
| EP | 0068817 | | | 1/1983 | |
| WO | 9100845 | | | 1/1991 | |

* cited by examiner

ZSM-5 TYPE MOLECULAR SIEVE SYNTHESIS METHOD

CROSS-REFERENCE TO RELATED APPLICATIONS

This application is the U.S. national stage of International Patent Application No. PCT/CN2013/088055, filed on Nov. 28, 2013 and entitled ZSM-5 TYPE MOLECULAR SIEVE SYNTHESIS METHOD, which claims the benefit of priority under 35 U.S.C. § 119 from Chinese Patent Application No. 201210500634.4, filed Nov. 29, 2012. The disclosures of the foregoing applications are incorporated herein by reference in their entirety.

FIELD OF THE INVENTION

The present invention pertains to the field of molecular sieve synthesis, and relates to a synthesis method of a ZSM-5 type molecular sieve characterized in that natural minerals are used as raw materials to provide the total silicon source and aluminum source required for ZSM-5 type molecular sieve synthesis.

BACKGROUND

Since ZSM-5 type molecular sieves were first reported in 1972 by Mobil Corp., US (U.S. Pat. No. 3,702,886), they have been widely applied in various fields such as petrochemical industry, fine chemical industry, and environmental protection due to their unique three-dimensional channel structures and shape-selective property as well as advantages of high silica-to-alumina ratio, lipophilicity and hydrophobicity, high thermal stability and hydrothermal stability, and high catalytic activity.

Synthesis methods of molecular sieves may be divided into two categories on the basis of sources of raw materials: synthesis with chemical reagents, and synthesis with natural minerals. Processes for synthesizing molecular sieves with conventional inorganic chemical reagents as raw materials are mature technology with easily controllable process conditions and high product quality. However, most of these inorganic chemical reagents are prepared from natural minerals through complicated reactions and separation procedures, with a long process route as well as high material and energy consumption, and most of the processes result in substantial emission of pollutants. Hence, if molecular sieves can be synthesized directly from silicon- and aluminum-rich natural minerals as raw materials, not only is there a wide range of sources of raw materials, but also the synthesis route from raw materials to molecular sieve products can be greatly shortened, and energy consumption, material consumption, and pollutant emission can be significantly reduced, and production cost can be remarkably lowered, so as to discover new approaches for molecular sieve synthesis, which shows great promise in development. To date, public reports on molecular sieve synthesis with natural minerals as raw materials are primarily focused on molecular sieve synthesis with natural minerals such as kaolin and rectorite as part of the silicon source or aluminum source.

Kaolin is a 1:1 type dioctohedral layered aluminosilicate clay mineral, with a typical chemical composition $Al_2O_3 \cdot 2SiO_2 \cdot 2H_2O$, and therefore may be used as the silicon source and aluminum source for molecular sieve synthesis. Rectorite has basic structural units of silica tetrahedra and alumina octahedra, wherein, in the unit layer, tetrahedral sheets link to octahedral sheets in a 1:1 or 2:1 fashion, with a chemical formula of its unit cell of $Al_4[Si_8O_{20}](OH)_4$. As such, rectorite may also be used as the silicon source and aluminum source for molecular sieve synthesis.

U.S. Pat. No. 6,908,603 discloses a method for in situ synthesis of ZSM-5 molecular sieves on kaolin microspheres. In this method, the reaction mixture comprises calcinated kaolin microspheres, crystal seed solution for promoting Y zeolite and silicate, and this reaction mixture has a silica-to-alumina molar ratio of more than 20 and a pH higher than 14. The above mixture is reacted for a period of time at a certain temperature to provide ZSM-5 crystals grown in situ on kaolin microspheres. No organic template or ZSM-5 crystal seed is present in the reaction mixture.

U.S. Pat. No. 4,091,007 discloses a method of preparing ZSM-5 molecular sieves with kaolin. In this method, the reaction mixture comprises alkali metal ions, tetrapropylammonium, silicon source, aluminum source, and water, in which the aluminum source is supplied by kaolin. Such a reaction mixture is crystallized at 75 to 205° C. for 1 hour to 60 days, and ZSM-5 molecular sieves may thus be obtained.

EP 0068817 makes public a synthesis method of ZSM-5 molecular sieves in which calcinated kaolin is extracted with acid before it is used as an aluminum source, and crystallized at a certain temperature and under certain pressure for 1 to 2 days, with quaternary ammonium as a template, to afford ZSM-5 molecular sieve crystals, wherein the temperature for crystallization is no higher than 200° C.

CN 101332995A discloses a method for preparing ZSM-5 molecular sieves based on in situ crystallization of kaolin, which is characterized in that ZSM-5 molecular sieves grow in a in situ crystallization manner on the inner and outer surfaces of modified kaolin, the ZSM-5 molecular sieve in the resultant composite has a relative crystallinity of 30% to 80%, and the in situ crystallized ZSM-5 molecular sieve thus obtained has characteristics including high crystallinity, small crystal size, high activity and good stability.

CN 101462740A discloses a method for preparing ZSM-5 molecular sieves based on in situ crystallization of kaolin. In this method, a kaolin slurry comprising kaolin, a binder and water is spray dried to prepare kaolin microspheres, and the prepared kaolin microspheres are calcinated; further, a silicon-rich clay slurry comprising silicon-rich clay, a binder and water is spray dried to prepare silicon-rich clay microspheres, and then calcinated; after such separate calcination, the kaolin microspheres and the silicon-rich clay microspheres are mixed with a base-containing aqueous solution, and the resultant mixture is hydrothermally crystallized to provide a crystallized product. The ZSM-5 molecular sieve product prepared by the above method, by reason of its high content of zeolite and abundant mesopores, may be used as a catalyst in the field of petrochemical industry.

Honghong SHAN (Applied Clay Science, 2009, 42:439-445) synthesized a ZSM-5 molecular sieve with kaolin calcinated at 700° C. as a raw material. The obtained ZSM-5 molecular sieves have a slate-like morphology with a length of about 10 μm, and their silica-to-alumina molar ratio are 7.7 to 32.5.

CN 101722024A discloses a ZSM-5 molecular sieve/rectorite composite material and the preparation method thereof. The composite material is a crystal product formed via in situ crystallization by using natural rectorite minerals which provide the aluminum source and part of the silicon source for molecular sieve synthesis and is also used as the matrix for molecular sieve growth. In this composite material, the percentage content by mass of the ZSM-5 molecular sieve is no less than 10%, and the ZSM-5 molecular sieve has a silica-to-alumina ratio of 20 to 60. The composite material prepared by this method has excellent hydrothermal stability.

In all of the above patents or literatures in which kaolin or rectorite minerals are used as raw material for preparing ZSM-5 molecular sieve, it is necessary to externally add a part of chemical silicon source (e.g., silica sol, water glass, sodium silicate etc.) in order to adjust the silica-to-alumina ratio in the system. The reason therefor lies in that natural mineral raw materials are mostly activated at high temperature in the about methods, and as a result, alumina octahedra therein are completely destructed, while silica tetrahedra are still preserved in the original layered structure of the mineral, which can only provide aluminum source and a small quantity of silicon source, and hence a large amount of chemical silicon source needs to be added so as to meet the requirement for the silica-to-alumina ratio of the target molecular sieve. Further, when ZSM-5 molecular sieves are prepared with the methods provided in the above patents or literatures, there remains a large amount of unreacted kaolin or rectorite residues, which impacts the crystallinity and purity of the molecular sieve. In recent years, as green chemistry develops, research and development in new chemical process is focusing on use of non-toxic and harmless raw materials, improvement in raw material utilization, lowering of energy consumption in production process, and reduction in pollutant emission. In the field of molecular sieve synthesis, if silicon and aluminum sources in natural minerals can be fully employed and natural minerals that are rich in amorphous silica are used as external silicon sources to adjust the feed ratio of silica to alumina, it is desirable to establish an environmentally friendly novel technical route for molecular sieve synthesis.

Diatomite is a biological sedimentary rock, which is preserved in a form of diatom remains that is formed by diatom biologically absorbing soluble silica in water under certain physicochemical conditions including light, temperature and nutrients. Diatomite has a general theoretical formula of $Mg_8[Si_{12}O_{30}](OH)_4(OH_2)_4 \cdot 8H_2O$, which is a 2:1 type chained layer structure. Chemical components in diatomite are primarily amorphous $SiO_2$, which may be used as the silicon source for molecular sieve synthesis after pretreatment such as purification and activation.

At present, synthesis of ZSM-5 type molecular sieves with natural minerals as raw materials has been reported, but only part of the silicon and aluminum in the mineral is utilized and a certain amount of external chemical silicon source or aluminum source is still needed to adjust silica-to-alumina ratio. It has not been reported that ZSM-5 type molecular sieves are synthesized with natural minerals as the total raw material without external addition of chemical silicon source or aluminum source. ZSM-5 type molecular sieves are molecular sieve materials widely used in the field of petrochemical industry, and development of techniques for synthesizing ZSM-5 type molecular sieves with natural minerals as the total raw material has great application prospect.

SUMMARY OF THE INVENTION

In order to solve the above problems, the present invention provides a synthesis method of ZSM-5 type molecular sieves, which is characterized in that natural minerals are used as the total silicon source and aluminum source needed for the molecular sieve synthesis and hydrothermally crystallized to produce the ZSM-5 type molecular sieves, wherein said natural minerals are a mixture of natural minerals having a low silica-to-alumina ratio together with natural minerals having a high silica-to-alumina ratio or with pure silicon.

In an embodiment of the present invention, the natural minerals having a low silica-to-alumina ratio are natural minerals having a silica-to-alumina molar ratio of 10 or less, and the natural minerals having a high silica-to-alumina ratio are natural minerals having a silica-to-alumina molar ratio of 30 or more.

In a further embodiment of the present invention, the natural mineral having a low silica-to-alumina ratio is kaolin, montmorillonite, bentonite, attapulgite and/or rectorite, and the natural mineral having a high silica-to-alumina ratio is diatomite and/or white carbon black.

In a particular embodiment of the present invention, the natural mineral having a low silica-to-alumina ratio is kaolin, and the natural mineral having a high silica-to-alumina ratio is diatomite.

With the method according to the present invention, hierarchical porous ZSM-5 type molecular sieves having different crystallinity and different silica-to-alumina ratios can be obtained. The resultant ZSM-5 type molecular sieve pertains to a hierarchical porous material having a silica-to-alumina molar ratio of 2.0 to 49.5 and crystallinity of 70% to 120% as compared to conventional ZSM-5 type molecular sieves synthesized by using pure chemical reagents.

The synthesis process route provided in the present invention not only greatly reduces the production cost for the molecular sieve synthesis, but also significantly improves the greenness in the synthesis process. The resultant molecular sieves have more superior physicochemical properties and lower synthesis costs.

DETAILED DESCRIPTION OF THE EMBODIMENTS

Figure 1:
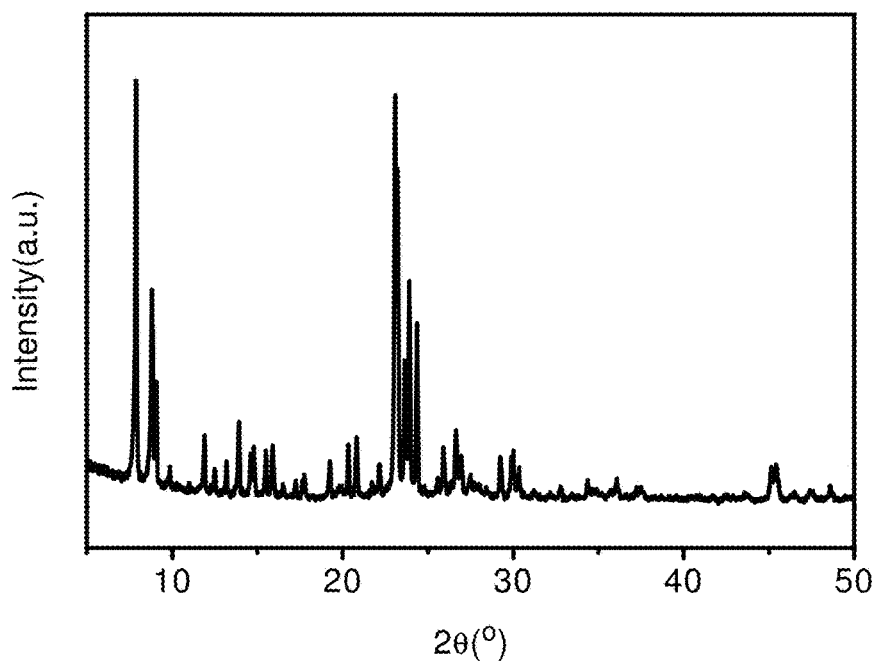
FIG. 1 shows the X-ray diffraction (XRD) spectrum of the ZSM-5 type molecular sieve obtained in Example 1 according to the present invention.

Particularly, the synthesis method of the ZSM-5 type molecular sieve provided by the present invention comprises the following steps:
(1) activation of natural kaolin mineral: kaolin and sodium hydroxide solid are mixed in a mass ratio of 3:1 to 1:3 and grinded, and then calcinated at 600 to 1000° C. to afford the raw material for ZSM-5 type molecular sieve synthesis; or kaolin and a sodium hydroxide solution are mixed in a mass ratio of 1:1 to 1:10, and then oven dried at 100 to 300° C. to afford the raw material for ZSM-5 type molecular sieve synthesis, wherein the sodium hydroxide solution is prepared by mixing solid sodium hydroxide and deionized water (DI water) in a mass ratio of 10:1 to 1:5;
(2) activation of natural diatomite mineral: diatomite and a sodium hydroxide solution are evenly mixed in a mass ratio of 1:1 to 5:1, and then oven dried at 100 to 300° C., followed by pulverization and screening, to afford the raw material for ZSM-5 type molecular sieve synthesis; or diatomite is calcinated at 600 to 1000° C. to afford the raw material for ZSM-5 type molecular sieve synthesis;

(3) DI water, a template, and the synthesis raw material obtained in step (1) are added into the synthesis raw material obtained in step (2), the molar ratio of the materials is adjusted to 0.085-0.4 $Na_2O$:$SiO_2$: 2.0-49.5 $Al_2O_3$: 10-60 $H_2O$, and the pH value of the synthesis system solution is adjusted to 9-13, preferably to 10-12, and then crystallization is carried out at 140 to 200° C. to obtain a crystallized product; and (4) the crystallized product obtained in step (3) is cooled, and filtered to remove the mother liquid, and the filter cake is washed with DI water till neutral and then dried to obtain the ZSM-5 type molecular sieve.

In a particular embodiment of the method according to the present invention, in step (3), the pH value of the synthesis system solution is adjusted to 9 to 13, preferably to 10-12, with a sulfuric acid solution, stirred at 50 to 75° C. for 0 to 20 h for aging, e.g., 4 to 12 h for aging, and then crystallized.

In the above synthesis method of ZSM-5 type molecular sieve according to present invention, natural diatomite and kaolin are used as the total silicon source and aluminum source. Natural diatomite and kaolin minerals are first pretreated and activated, into which a template, sodium hydroxide solution, and DI water are added with the molar ratio of materials adjusted as above; next, the synthesis system is aged under stirring at 50 to 75° C. for 0 to 20 h, or 2 to 20 h, e.g., aged for 0, 4, 6, 8, or 12 h, and then crystallized at 140 to 200° C. for 4 to 72 h to give a crystallized product; subsequently, the above crystallized product is cooled, and filtered to remove the mother liquid, and the filter cake is washed with DI water till neutral and then dried to obtain the ZSM-5 type molecular sieve.

The template according to the present invention is one or a mixture of more than one of tetrapropylammonium bromide, tetraethylammonium bromide, and n-butyl amine, and the template is used in an amount with a molar ratio of 0.01:1 to 0.3:1 with respect to the $SiO_2$ in the synthesis system.

In the present invention, the total silicon source and aluminum source needed for molecular sieve synthesis are provided by natural mineral raw materials without addition of other forms of chemical silicon source or aluminum source, and the applied field of natural minerals and the raw material sources for molecular sieve synthesis are thus broadened.

According to the present invention, the natural minerals having a low silica-to-alumina ratio refer to natural minerals having a silica-to-alumina molar ratio of 10 or less, and the natural minerals having a high silica-to-alumina ratio refer to natural minerals having a silica-to-alumina molar ratio of 30 or more. Therefore, in the method according to the present invention, in addition to kaolin, the natural minerals having a low silica-to-alumina ratio may be selected from natural minerals such as montmorillonite, bentonite, attapulgite or rectorite; in addition to diatomite, the natural minerals having a high silica-to-alumina ratio may be selected from white carbon black made from natural minerals. The pure silicon described in the present invention refers to refined minerals which are high grade minerals.

The preparation method according to the present invention is advantageous in its simple process, readily available raw materials, and controllable silicon-to-aluminum ratio of the product. Molecular sieves synthesized in the present invention have XRD characteristic peaks of ZSM-5 type molecular sieves. By subjecting such ZSM-5 type molecular sieves to ionic modification with ammonium chloride, ammonium hydrogen phosphate, rare earth or the like, various types, e.g., HZSM-5, P-HZSM-5, Re-HZSM-5, of modified ZSM-5 type molecular sieves can be prepared, which have the same physicochemical properties as those of the same type of molecular sieves synthesized with inorganic chemical reagents as silicon source and aluminum source.

Hereinafter, the present invention will be further described in combination with the Examples, which is intended to illustrate the embodiments and features of the present invention in details and may not be construed as limitation to the present invention in any way.

Relative crystallinity described in the Examples is a ratio between the sum of the area of the characteristic peaks of the obtained product at a 2θ angle between 22.5°-25.0° in the XRD spectrum and that of a NaZSM-5 molecular sieve standard, presented in percentage. The standard is a commercial ZSM-5 molecular sieve prepared with conventional chemical reagents as raw materials (Nankai Catalyst Co., Ltd, Tianjin (the Catalyst Plant of Nankai University), Na-type ZSM-5 molecular sieve, with a silica-to-alumina ratio of 38.0), the crystallinity of which is defined as 100%.

The silica-to-alumina ratio of the product is characterized by an X-ray fluorescence (XRF) method using a ZSX-100e4580 model X-ray fluorescence spectrometer (Rigaku, Japan). The silica-to-alumina ratio described in the present invention is a molar ratio between $SiO_2$ and $Al_2O_3$.

Example 1

The diatomite, kaolin, and rectorite used are commercially available products. Primary components in the diatomite include: $SiO_2$ in a content of 93.6 wt. %, and $Al_2O_3$ in a content of 3.2 wt. %; and primary components in the kaolin include: $SiO_2$ in a content of 50.5 wt. %, and $Al_2O_3$ in a content of 44.6 wt. %.

Commercial diatomite and kaolin were respectively oven dried, pulverized into powders. 50.00 g diatomite powder was weighed, calcinated at 800° C. for 4 h, and was ready for use. 12.00 g kaolin powder was weighed and evenly mixed with 16.00 g sodium hydroxide solid, into which 50.00 g DI water was added, then oven dried at 200° C., and was ready for use.

6.15 g sodium hydroxide solid was dissolved in 150.00 g DI water, cooled to room temperature (RT), and was ready for use. 50.00 g concentrated sulfuric acid solution with a mass fraction of 98% was weighed and added into 50.00 g DI water, cooled to RT, and was ready for use. 4.30 g tetrapropylammonium bromide solid was weighed and dissolved in 20 g DI water, and was ready for use.

Figure 2:
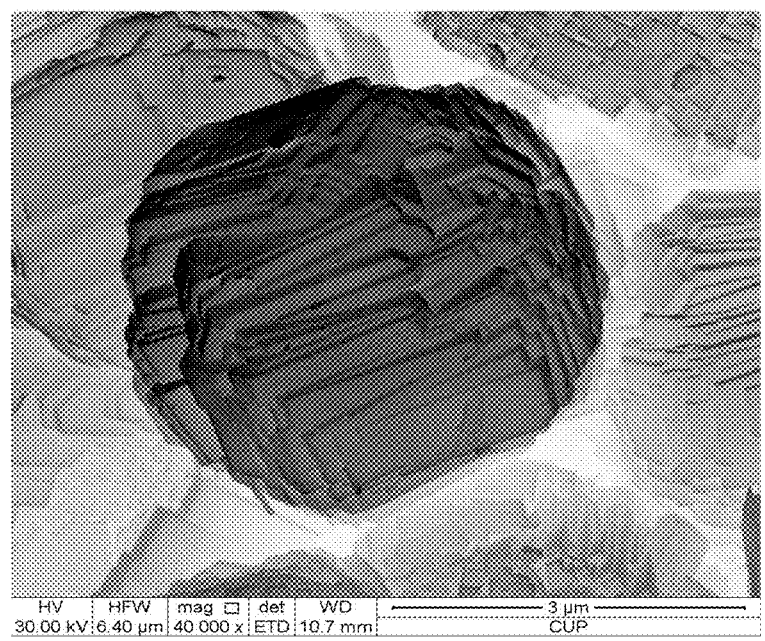
FIG. 2 shows the scanning electronic microscope (SEM) photograph magnified by 40,000 times of the ZSM-5 type molecular sieve obtained in Example 1 according to the present invention.

5.20 g of the above calcinated diatomite powder was weighed, into which 15.62 g of the above sodium hydroxide solution, 0.62 g of the above treated kaolin powder, 12.15 g of the above tetrapropylammonium bromide solution, and 33.32 g DI water were added. The pH value of the mixture was adjusted to 11 with the above sulfuric acid solution, and mixed under stirring at 60° C. for 4 h. The mixture was then poured into a Teflon-lined stainless steel autoclave, heated to 170° C., and static crystallization was carried out for 48 h. After the crystallization was completed, the mixture was cooled, filtered to remove mother liquid, washed till neutral, and dried at 120° C. to afford a crystallized product. The phase of the product was identified by XRD characterization as ZSM-5 molecular sieve, the relative crystallinity of the ZSM-5 molecular sieve in the product was 120%, and the silica-to-alumina ratio of the product was 30. The XRD spectrum was shown in FIG. 1, and the SEM photograph was shown in FIG. 2.

Example 2

The pretreatment methods of diatomite and kaolin, as well as the preparations of the sodium hydroxide solution, the sulfuric acid solution, and the tetrapropylammonium bromide solution were the same as in Example 1.

Figure 3:
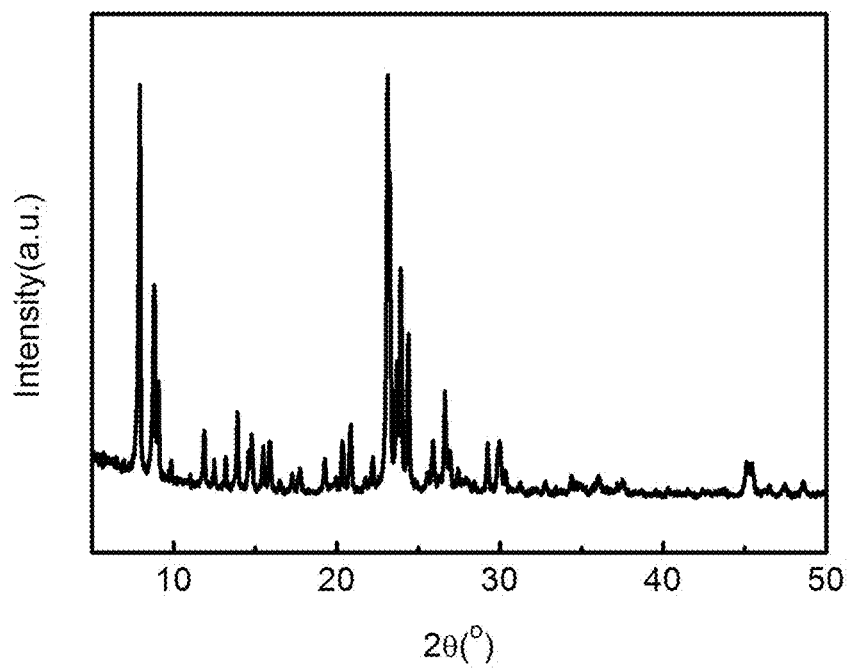
FIGS. 3 to 12 shows the X-ray diffraction (XRD) spectra of the ZSM-5 type molecular sieves obtained in Examples 2 to 11 according to the present invention, respectively.

5.20 g of the above calcinated diatomite powder was weighed, into which 15.62 g of the above sodium hydroxide solution, 0.31 g of the above treated kaolin powder, 12.15 g of the above tetrapropylammonium bromide solution, and 33.32 g DI water were added. The pH value of the mixture was adjusted to 11 with the above sulfuric acid solution, and mixed under stirring at 60° C. for 4 h. The mixture was then poured into a Teflon-lined stainless steel autoclave, heated to 170° C., and static crystallization was carried out for 48 h. After the crystallization was completed, the mixture was cooled, filtered to remove mother liquid, washed till neutral, and dried at 120° C. to afford a crystallized product. The phase of the product was identified by XRD characterization as ZSM-5 molecular sieve, the relative crystallinity of the ZSM-5 molecular sieve in the product was 92%, and the silica-to-alumina ratio of the product was 45. The XRD spectrum was shown in FIG. 3.

Example 3

The pretreatment methods of diatomite and kaolin, as well as the preparations of the sodium hydroxide solution, the sulfuric acid solution, and the tetrapropylammonium bromide solution were the same as in Example 1.

Figure 4:
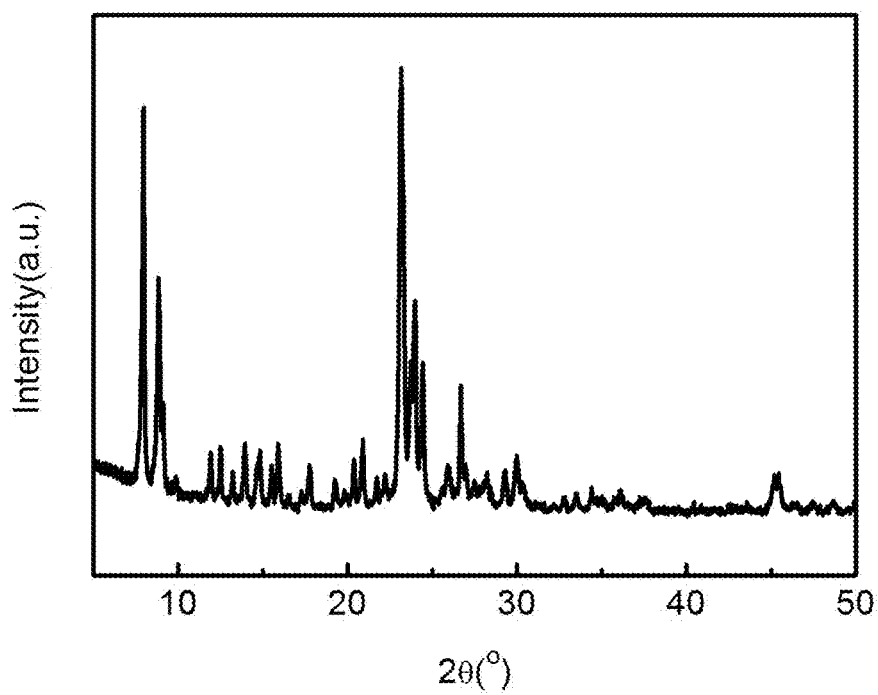

5.20 g of the above calcinated diatomite powder was weighed, into which 10.00 g of the above sodium hydroxide solution was added, and then mixed under stiffing at 70° C. for 4 h. 1.24 g of the above treated kaolin powder, 12.15 g of the above tetrapropylammonium bromide solution, and 33.32 g DI water were then added thereto. The pH value of the mixture was adjusted to 11 with the above sulfuric acid solution, and mixed under stiffing at 60° C. for 4 h. The mixture was then poured into a Teflon-lined stainless steel autoclave, heated to 170° C., and static crystallization was carried out for 48 h. After the crystallization was completed, the mixture was cooled, filtered to remove mother liquid, washed till neutral, and dried at 120° C. to afford a crystallized product. The phase of the product was identified by XRD characterization as ZSM-5 molecular sieve, the relative crystallinity of the ZSM-5 molecular sieve in the product was 114%, and the silica-to-alumina ratio of the product was 15. The XRD spectrum was shown in FIG. 4.

Example 4

The preparations of the sodium hydroxide solution, the sulfuric acid solution, and the tetrapropylammonium bromide solution, as well as the pretreatment method of kaolin were the same as in Example 1.

Commercial diatomite was oven dried and pulverized into powder. 50.00 g diatomite powder was weighed and added into 100.00 g NaOH solution, oven dried at 200° C. for 4 h, pulverized, screened to 100 to 200 mesh, and was ready for use.

Figure 5:
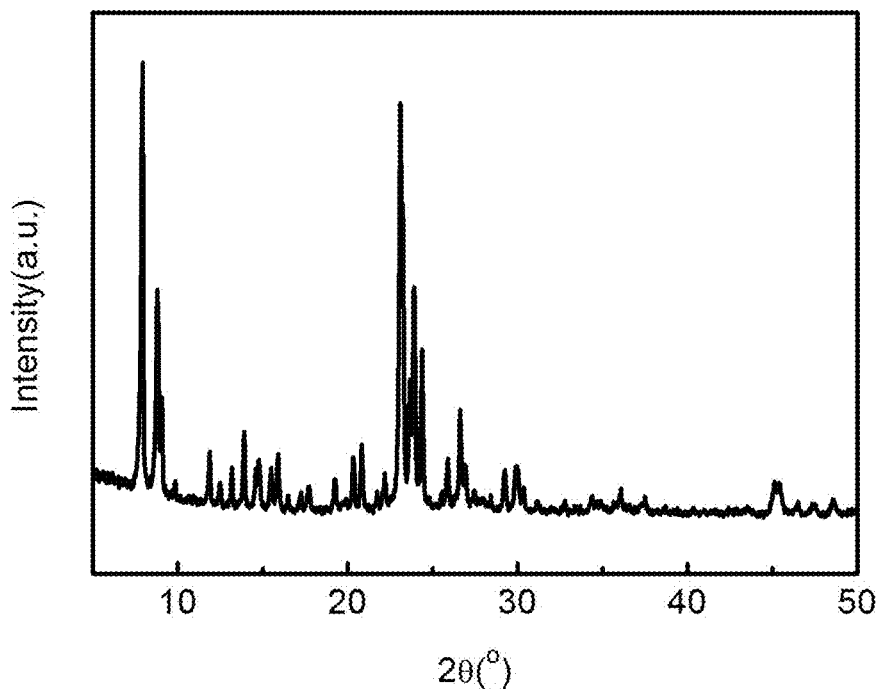

5.20 g of the above calcinated diatomite powder was weighed, into which 10.00 g DI water, 0.62 g of the above treated kaolin powder, 12.15 g of the above tetrapropylammonium bromide solution, and 33.32 g DI water were added. The pH value of the mixture was adjusted to 11 with the above sulfuric acid solution, and mixed under stiffing at 60° C. for 4 h. The mixture was then poured into a Teflon-lined stainless steel autoclave, heated to 170° C., and static crystallization was carried out for 48 h. After the crystallization was completed, the mixture was cooled, filtered to remove mother liquid, washed till neutral, and dried at 120° C. to afford a crystallized product. The phase of the product was identified by XRD characterization as ZSM-5 molecular sieve, the relative crystallinity of the ZSM-5 molecular sieve in the product was 95%, and the silica-to-alumina ratio of the product was 28. The XRD spectrum was shown in FIG. 5.

Example 5

The preparations of the sodium hydroxide solution, the sulfuric acid solution, and the tetrapropylammonium bromide solution, as well as the pretreatment method of diatomite were the same as in Example 1.

12.00 g kaolin powder was weighed and evenly mixed with 16.00 g sodium hydroxide solid, then calcinated at 800° C. for 4 h, and was ready for use.

Figure 6:
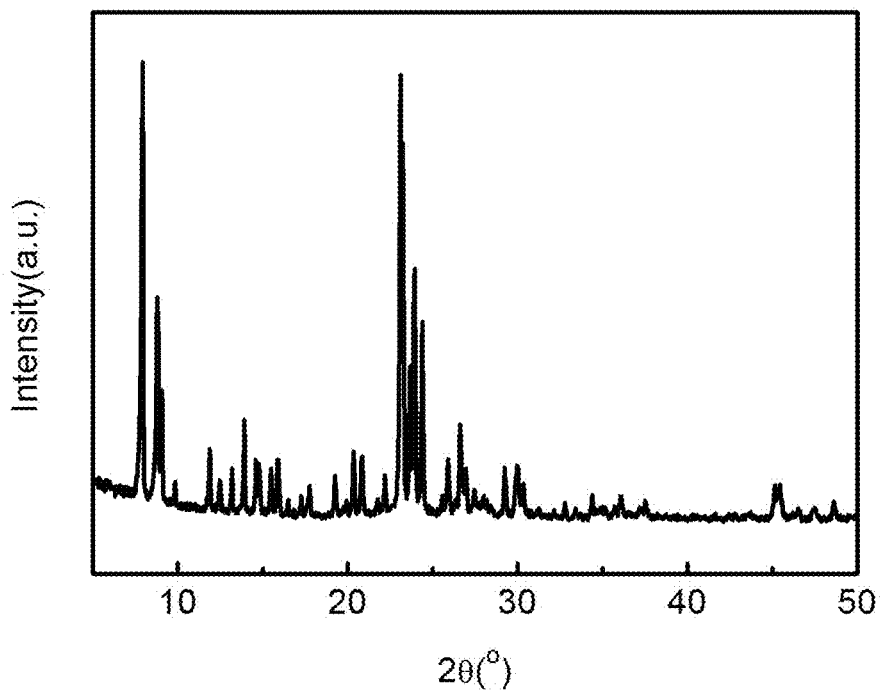

5.20 g of the above calcinated diatomite powder was weighed, into which 15.62 g of the above sodium hydroxide solution, 0.62 g of the above treated kaolin powder, 12.15 g of the above tetrapropylammonium bromide solution, and 33.32 g DI water were added. The pH value of the mixture was adjusted to 11 with the above sulfuric acid solution, and mixed under stirring at 60° C. for 4 h. The mixture was then poured into a Teflon-lined stainless steel autoclave, heated to 170° C., and static crystallization was carried out for 48 h. After the crystallization was completed, the mixture was cooled, filtered to remove mother liquid, washed till neutral, and dried at 120° C. to afford a crystallized product. The phase of the product was identified by XRD characterization as ZSM-5 molecular sieve, the relative crystallinity of the ZSM-5 molecular sieve in the product was 98%, and the silica-to-alumina ratio of the product was 25. The XRD spectrum was shown in FIG. 6.

Example 6

The preparations of the sodium hydroxide solution, the sulfuric acid solution, and the tetrapropylammonium bromide solution, as well as the pretreatment methods of diatomite and kaolin were the same as in Example 1.

Figure 7:
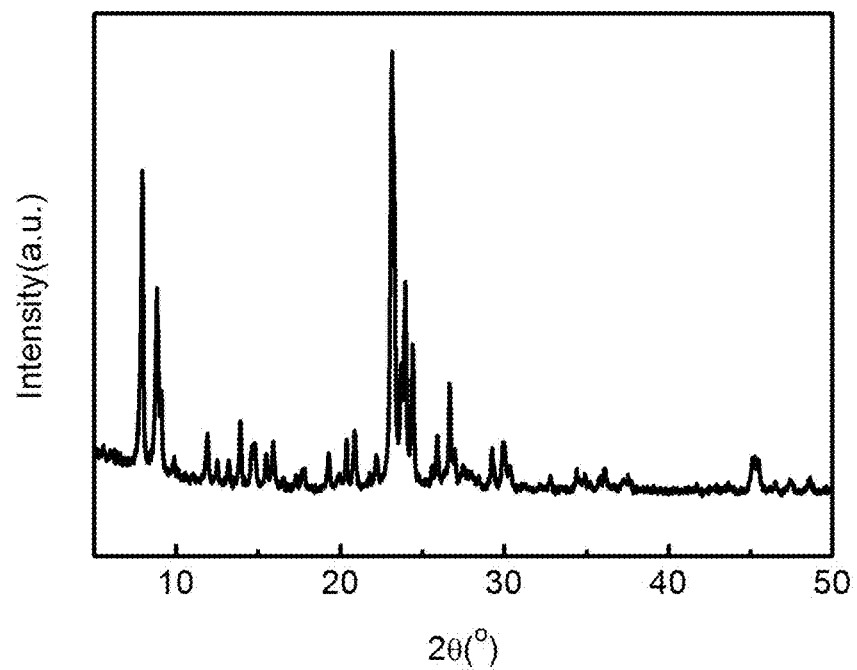

9.62 g of the above calcinated diatomite powder was weighed, into which 28.90 g of the above sodium hydroxide solution, 1.15 g of the above treated kaolin powder, 22.45 g of the above tetrapropylammonium bromide solution, and 7.70 g DI water were added. The pH value of the mixture was adjusted to 12 with the above sulfuric acid solution, and mixed under stirring at 60° C. for 8 h. The mixture was then poured into a Teflon-lined stainless steel autoclave, heated to 170° C., and static crystallization was carried out for 36 h. After the crystallization was completed, the mixture was cooled, filtered to remove mother liquid, washed till neutral, and dried at 120° C. to afford a crystallized product. The phase of the product was identified by XRD characterization as ZSM-5 molecular sieve, the relative crystallinity of the ZSM-5 molecular sieve in the product was 110%, and the silica-to-alumina ratio of the product was 29. The XRD spectrum was shown in FIG. 7.

Example 7

The pretreatment methods of diatomite and kaolin, as well as the preparations of the sodium hydroxide solution, the sulfuric acid solution, and the tetrapropylammonium bromide solution were the same as in Example 1.

Figure 8:
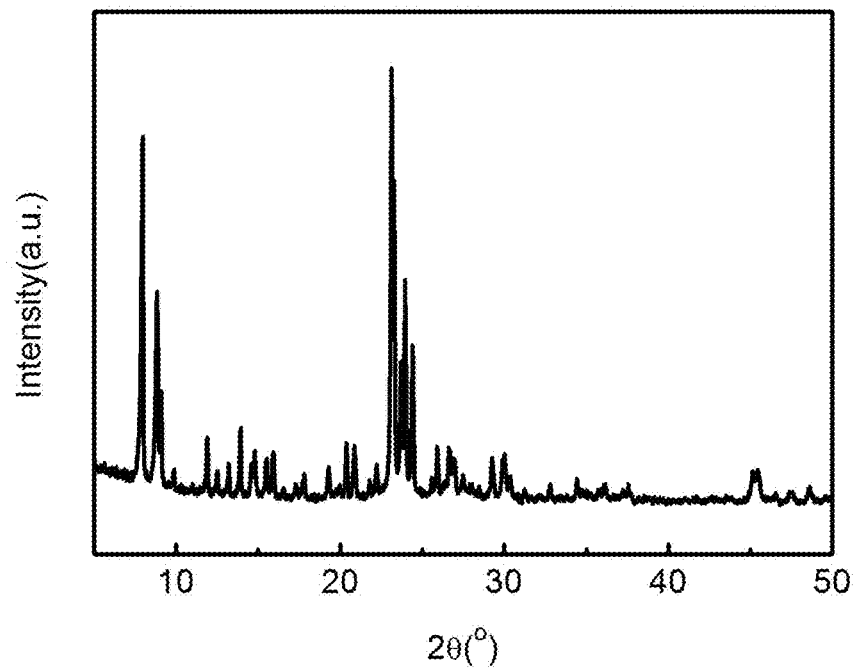

5.20 g of the above calcinated diatomite powder was weighed, into which 15.62 g of the above sodium hydroxide solution was added, and mixed under stirring at 70° C. for 4 h. 0.62 g of the above treated kaolin powder, 12.15 g of the above tetrapropylammonium bromide solution, and 33.32 g DI water were then added thereto. The pH value of the mixture was adjusted to 11 with the above sulfuric acid solution, then poured into a Teflon-lined stainless steel autoclave, heated to 170° C., and static crystallization was carried out for 48 h. After the crystallization was completed, the mixture was cooled, filtered to remove mother liquid, washed till neutral, and dried at 120° C. to afford a crystallized product. The phase of the product was identified by XRD characterization as ZSM-5 molecular sieve, the relative crystallinity of the ZSM-5 molecular sieve in the product was 108%, and the silica-to-alumina ratio of the product was 32. The XRD spectrum was shown in FIG. 8.

Example 8

The pretreatment methods of diatomite and kaolin, as well as the preparations of the sodium hydroxide solution, the sulfuric acid solution, and the tetrapropylammonium bromide solution were the same as in Example 1.

Figure 9:
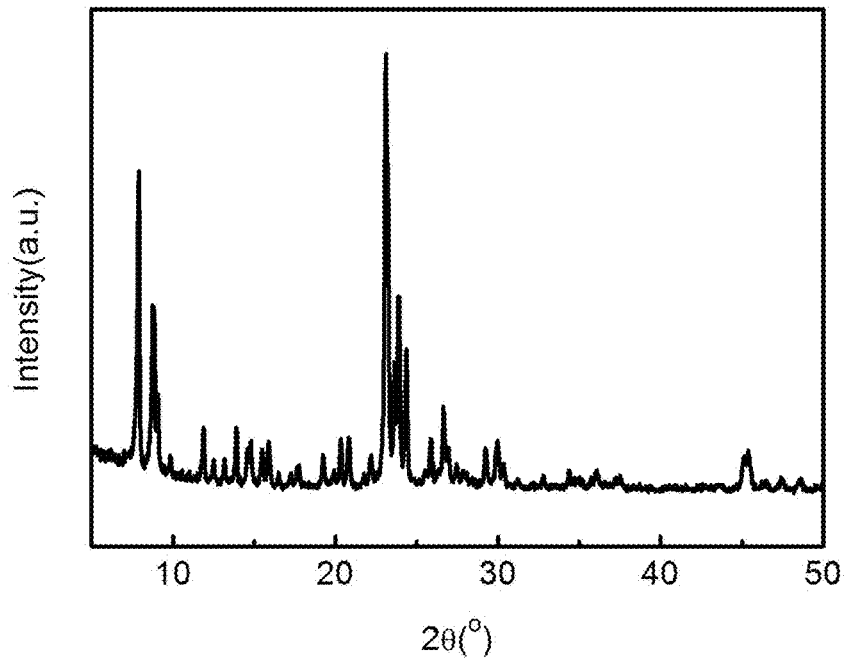

5.20 g of the above calcinated diatomite powder was weighed, into which 31.24 g of the above sodium hydroxide solution was added, and mixed under stirring at 70° C. for 8 h. 0.62 g of the above treated kaolin powder, 12.15 g of the above tetrapropylammonium bromide solution, and 18.32 g DI water were then added thereto. The pH value of the mixture was adjusted to 11 with the above sulfuric acid solution, and mixed under stirring at 60° C. for 12 h. The mixture was then poured into a Teflon-lined stainless steel autoclave, heated to 170° C., and static crystallization was carried out for 72 h. After the crystallization was completed, the mixture was cooled, filtered to remove mother liquid, washed till neutral, and dried at 120° C. to afford a crystallized product. The phase of the product was identified by XRD characterization as ZSM-5 molecular sieve, the relative crystallinity of the ZSM-5 molecular sieve in the product was 103%, and the silica-to-alumina ratio of the product was 30. The XRD spectrum was shown in FIG. 9.

Example 9

The pretreatment methods of diatomite and kaolin, as well as the preparations of the sodium hydroxide solution, the sulfuric acid solution, and the tetrapropylammonium bromide solution were the same as in Example 1.

Figure 10:
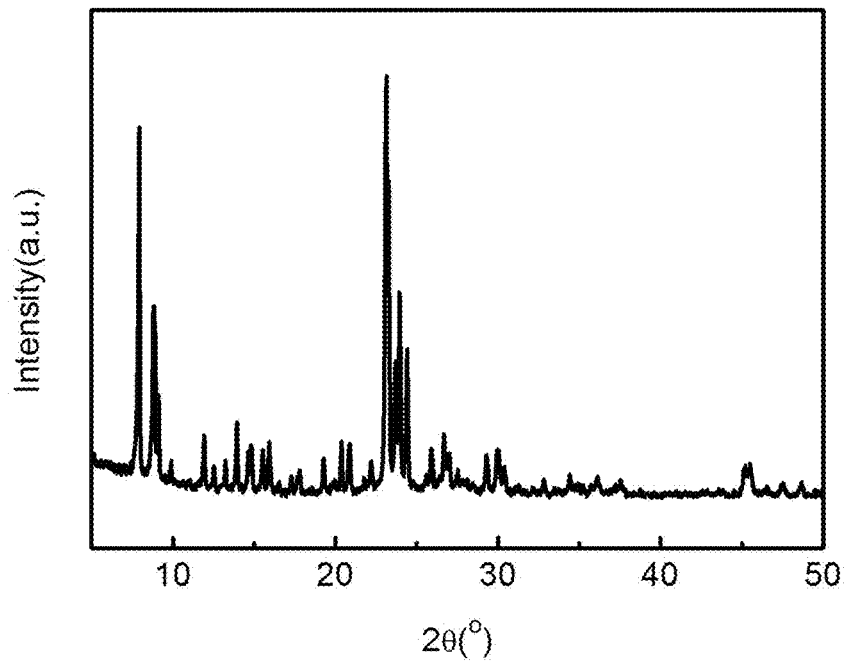

5.20 g of the above calcinated diatomite powder was weighed, into which 7.81 g of the above sodium hydroxide solution was added, and mixed under stirring at 70° C. for 24 h. 0.62 g of the above treated kaolin powder, 12.15 g of the above tetrapropylammonium bromide solution, and 41.13 g DI water were then added thereto. The pH value of the mixture was adjusted to 11 with the above sulfuric acid solution, and mixed under stirring at 60° C. for 20 h. The mixture was then poured into a Teflon-lined stainless steel autoclave, heated to 180° C., and static crystallization was carried out for 60 h. After the crystallization was completed, the mixture was cooled, filtered to remove mother liquid, washed till neutral, and dried at 120° C. to afford a crystallized product. The phase of the product was identified by XRD characterization as ZSM-5 molecular sieve, the relative crystallinity of the ZSM-5 molecular sieve in the product was 75%, and the silica-to-alumina ratio of the product was 22. The XRD spectrum was shown in FIG. 10.

Example 10

The pretreatment method of diatomite, as well as the preparations of the sodium hydroxide solution, the sulfuric acid solution, and the tetrapropylammonium bromide solution was the same as in Example 1.

6.00 g rectorite powder was weighed, and evenly mixed with 8.00 g sodium hydroxide solid, into which 50.00 g DI water was added, then dried at 200° C., and was ready for use.

Figure 11:
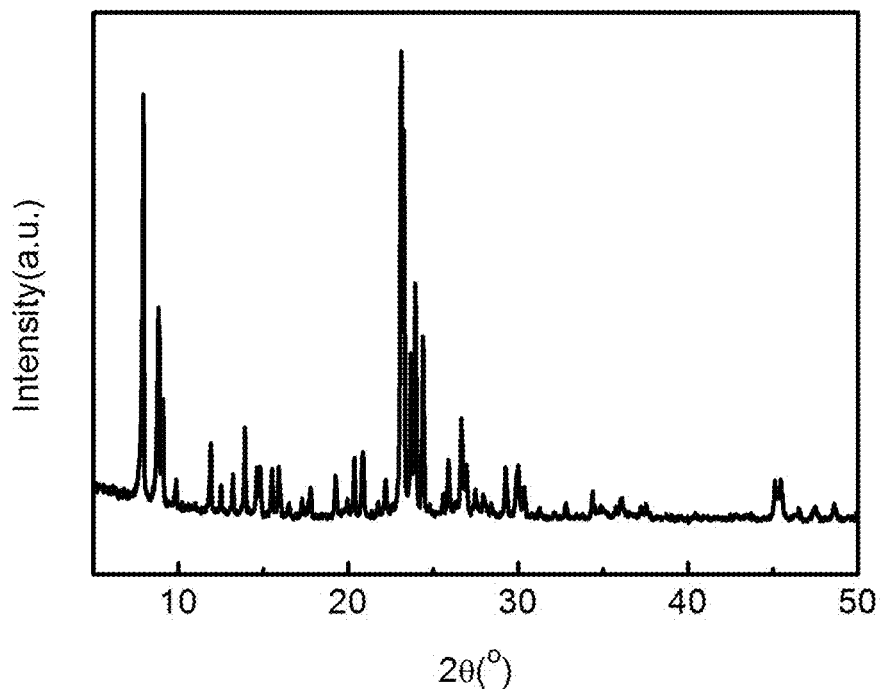

5.20 g of the above calcinated diatomite powder was weighed, into which 19.60 g of the above sodium hydroxide solution, 0.35 g of the above treated rectorite powder, 12.15 g of the above tetrapropylammonium bromide solution, and 29.49 g DI water were added. The pH value of the mixture was adjusted to 11 with the above sulfuric acid solution, and mixed under stirring at 60° C. for 6 h. The mixture was then poured into a Teflon-lined stainless steel autoclave, heated to 170° C., and static crystallization was carried out for 48 h. After the crystallization was completed, the mixture was cooled, filtered to remove mother liquid, washed till neutral, and dried at 120° C. to afford a crystallized product. The phase of the product was identified by XRD characterization as ZSM-5 molecular sieve, the relative crystallinity of the ZSM-5 molecular sieve in the product was 112%, and the silica-to-alumina ratio of the product was 28. The XRD spectrum was shown in FIG. 11.

Example 11

The pretreatment method of diatomite, as well as the preparations of the sodium hydroxide solution, the sulfuric acid solution, and the tetrapropylammonium bromide solution was the same as in Example 1.

6.00 g montmorillonite powder was weighed, and evenly mixed with 8.00 g sodium hydroxide solid, into which 50.00 g DI water was added, then dried at 200° C., and was ready for use.

Figure 12:
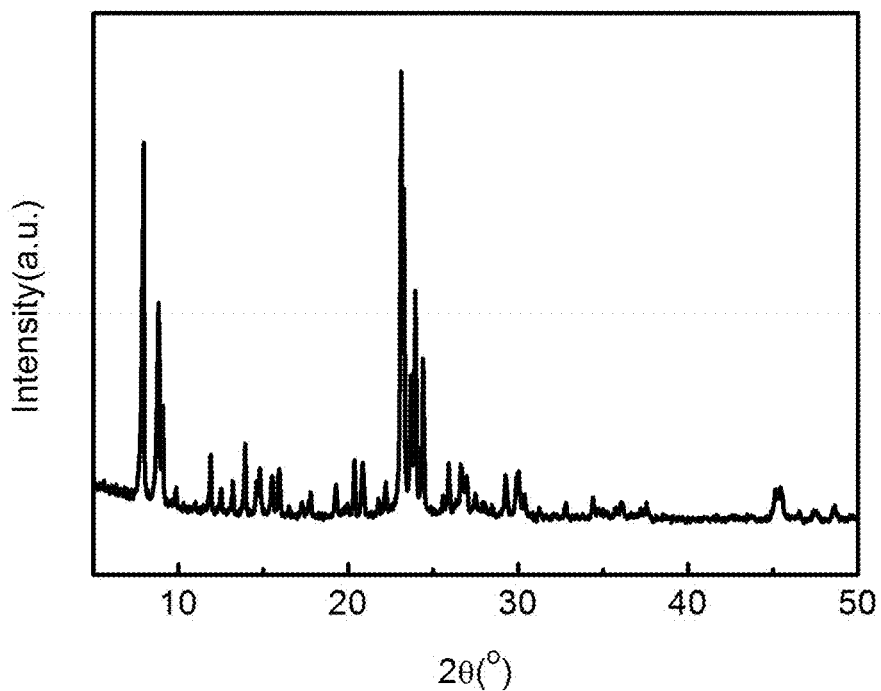

5.20 g of the above calcinated diatomite powder was weighed, into which 19.04 g of the above sodium hydroxide solution, 0.44 g of the above treated montmorillonite powder, 12.15 g of the above tetrapropylammonium bromide solution, and 30.03 g DI water were added. The pH value of the mixture was adjusted to 11 with the above sulfuric acid solution, and mixed under stirring at 60° C. for 6 h. The mixture was then poured into a Teflon-lined stainless steel autoclave, heated to 170° C., and static crystallization was carried out for 48 h. After the crystallization was completed, the mixture was cooled, filtered to remove mother liquid, washed till neutral, and dried at 120° C. to afford a crystallized product. The phase of the product was identified by XRD characterization as ZSM-5 molecular sieve, the relative crystallinity of the ZSM-5 molecular sieve in the product was 110%, and the silica-to-alumina ratio of the product was 33. The XRD spectrum was shown in FIG. 12.

As demonstrated in the above Examples, ZSM-5 type molecular sieves synthesized through hydrothermal crystallization, with the total silicon source or aluminum source needed for the synthesis provided by natural diatomite mineral and natural kaolin mineral, are more superior in physicochemical properties than ZSM-5 molecular sieves prepared with pure chemical reagents, with a lower synthesis cost. As shown by the data in the table below, in terms of hydrothermal stability, for example, the ZSM-5 type molecular sieves synthesized in the present invention have a relative crystallinity retainment of more than 70% after hydrothermal treatment under the conditions of 800° C. and 100% vapor for 4 h; whereas, commercial ZSM-5 molecular sieves synthesized with conventional chemical reagents as raw material has a relative crystallinity retainment of merely 62% under the same conditions, wherein the relative crystallinity retainment is defined as the ratio between the difference of relative crystallinity before and after the hydrothermal treatment and the relative crystallinity before hydrothermal aging.

| | Examples | | | | | | | | | | | Commercial ZSM-5* |
|---|---|---|---|---|---|---|---|---|---|---|---|---|
| | 1 | 2 | 3 | 4 | 5 | 6 | 7 | 8 | 9 | 10 | 11 | |
| Relative crystallinity retainment/% | 73 | 70 | 72 | 71 | 70 | 73 | 76 | 72 | 75 | 74 | 73 | 62 |

*Commercial ZSM-5 molecular sieve (Nankai Catalyst Co., Ltd, Tianjin (the Catalyst Plant of Nankai University), Na-type ZSM-5 molecular sieve, with a silica-to-alumina ratio of 38.0), the crystallinity of which is defined as 100%.

The invention claimed is:

1. A synthesis method for producing ZSM-5 molecular sieves, comprising using natural minerals as the total silicon source and an aluminum source needed for the molecular sieve synthesis, and performing hydrothermal crystallization to produce the ZSM-5 molecular sieves, wherein said natural minerals are a mixture of one or more natural minerals having a low silica-to-alumina ratio together with a natural mineral having a high silica-to-alumina ratio, wherein the one or more natural minerals having a low silica-to-alumina ratio have a silica-to-alumina molar ratio of 10 or less and are selected from the group consisting of kaolin, montmorillonite, bentonite, attapulgite and rectorite, and wherein the natural mineral having a high silica-to-alumina ratio is diatomite having a silica-to-alumina molar ratio of 30 or more.

2. The synthesis method of claim 1, wherein the one or more natural mineral having a low silica-to-alumina ratio is kaolin.

3. The synthesis method of claim 2, wherein the ZSM-5 molecular sieve is a hierarchical porous material having a silica-to-alumina molar ratio of 2.0 to 49.5, with a crystallinity of 70% to 120% as compared to a conventional ZSM-5 molecular sieve synthesized by using pure chemical reagents.

4. The synthesis method of claim 1, further comprising the following steps:
(1) activating kaolin with the following process:
  (a) mixing kaolin and sodium hydroxide solid in a mass ratio of 3:1 to 1:3, grinding the mixture, and then calcinating the ground mixture at 600 to 1000° C. to obtain activated kaolin for the ZSM-5 molecular sieve synthesis; or
  (b) mixing kaolin and a sodium hydroxide solution in a mass ratio of 1:1 to 1:10, and then drying the mixture at 100 to 300° C. to obtain activated kaolin for the ZSM-5 molecular sieve synthesis, wherein the sodium hydroxide solution is prepared by mixing solid sodium hydroxide and water in a mass ratio of 10:1 to 1:5;
(2) activating diatomite with the following process:
  (a) calcinating diatomite at 600 to 1000° C. to obtain activated diatomite for the ZSM-5 molecular sieve synthesis; or
  (b) mixing diatomite and a sodium hydroxide solution evenly in a mass ratio of 1:1 to 5:1, and then drying at 100 to 300° C. to obtain activated diatomite for the ZSM-5 molecular sieve synthesis, wherein the sodium hydroxide solution is prepared by mixing solid sodium hydroxide and water in a mass ratio of 10:1 to 1:5;
(3) mixing deionized water, a template, and the activated kaolin obtained in step (1) with the activated diatomite obtained in step (2) to obtain an aqueous mixture; adjusting the molar ratio of the aqueous mixture to 0.085-0.4 $Na_2O$:$SiO_2$:2.0-49.5 $Al_2O_3$:10-60 $H_2O$ to obtain a synthesis system solution; adjusting the pH value of the synthesis system solution to 9-13; and then conducting crystallization at 140 to 200° C. to obtain a crystallized product; and
(4) cooling and filtering the crystallized product obtained in step (3); to remove the mother liquid; and washing the filter cake with deionized water until neutral; and then drying to obtain the ZSM-5 molecular sieve.

5. The synthesis method of claim 4, wherein the template is one or a mixture of more than one of tetrapropylammonium bromide, tetraethylammonium bromide, and n-butyl amine, and the template is used in an amount with a molar ratio of 0.01:1 to 0.3:1 with respect to the $SiO_2$ in the synthesis system.

6. The synthesis method of sieves according to claim 5, wherein, in step (3), the pH value of the synthesis system solution is adjusted to 9 to 13 with a sulfuric acid solution, stirred at 50 to 75° C. for 0 to 20 h for aging, and then crystallized.

7. The synthesis method of claim 6, wherein, in step (3), the pH value of the synthesis system solution is adjusted to 10 to 12 by using a sulfuric acid solution.

* * * * *